United States Patent [19]

Dorrian

[11] 4,097,911
[45] Jun. 27, 1978

[54] BASE METAL ELECTRODE CAPACITOR AND METHOD OF MAKING THE SAME

[75] Inventor: John F. Dorrian, Erie, Pa.

[73] Assignee: Erie Technological Products, Inc., Erie, Pa.

[21] Appl. No.: 620,244

[22] Filed: Oct. 6, 1975

[51] Int. Cl.² .......................... H01G 1/01; H01G 4/12
[52] U.S. Cl. ................................... 361/305; 29/25.42; 361/313; 361/321; 361/322; 427/79
[58] Field of Search ............... 317/258, 261; 29/25.42; 361/321, 313, 322, 305; 264/91; 427/79

[56] References Cited

U.S. PATENT DOCUMENTS

| | | | |
|---|---|---|---|
| 3,277,354 | 10/1966 | Ikeda | 317/258 |
| 3,426,257 | 2/1969 | Yougquist | 317/261 X |
| 3,534,238 | 10/1970 | Buehlor | 317/258 |
| 3,617,834 | 11/1971 | Rayburn | 317/261 |
| 3,809,973 | 5/1974 | Hurley | 317/258 |
| 3,902,102 | 8/1975 | Burn | 317/258 |
| 3,920,781 | 11/1975 | Eror | 264/61 |

Primary Examiner—E. A. Goldberg
Attorney, Agent, or Firm—Ralph A. Hammar

[57] ABSTRACT

A monolithic ceramic capacitor with base metal electrodes fired in an atmosphere of oxygen at low partial pressure in which the reaction between the electrodes and the ceramic prevents conversion of the ceramic into the semiconductive state. The base metal is a transition metal or a transition metal alloy, preferably nickel. The method is usable with any green ceramic without changing the firing temperature. The only change required is from the normal oxygen partial pressure in the kiln open to the atmosphere to an atmosphere of much lower oxygen partial pressure.

20 Claims, 6 Drawing Figures

BASE METAL ELECTRODE CAPACITOR AND METHOD OF MAKING THE SAME

This invention is intended to improve monolithic titanate ceramic capacitors by firing the ceramic under conditions at which the base metal electrode reacts with the ceramic to an extent sufficient to neutralize unlocalized electrons which normally occur when a barium titanate ceramic is fired in a reducing atmosphere and which lead to an n-type (electron) conductivity in the dielectric. The use of the electrode to protect the ceramic from reduction to the semiconductive state is applicable generally and is not limited to special ceramic formulations. To use this invention it is not necessary to devise any special ceramic formulations or to develop new firing temperatures.

In the drawing

Figure 1:
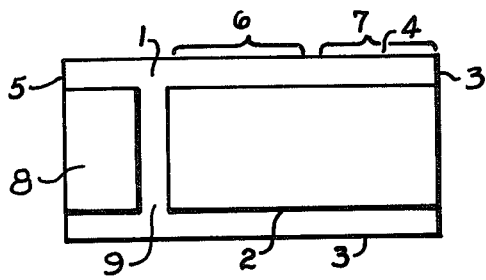
FIG. 1 is a plan view of one of the ceramic layers used in making a monolithic capacitor which has been coated with an electrode pattern of base metal paint.
Figure 2:
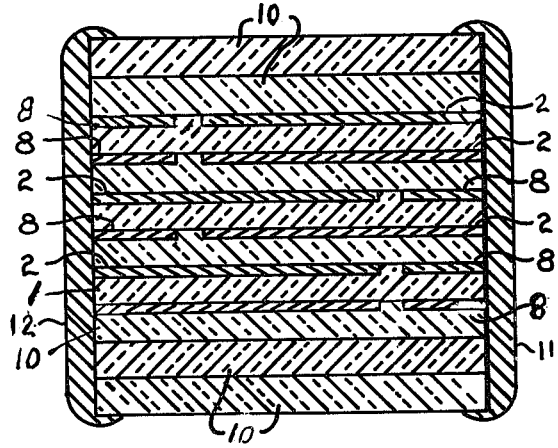
FIG. 2 is a cross sectional view of a multilayer monolithic capacitor before firing.
Figure 3:
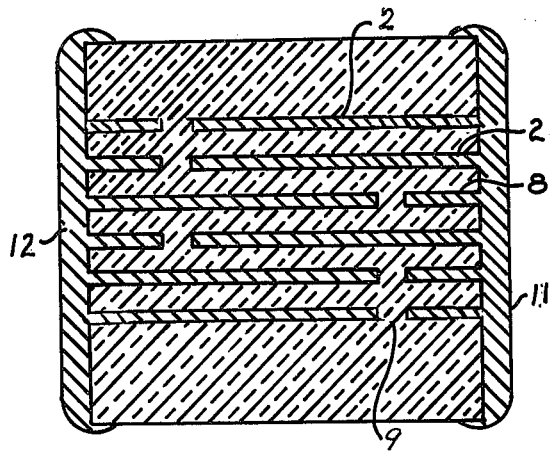
FIG. 3 is a similar view after firing.

In a preferred form of the above invention illustrated in the drawings the capacitor is made from a plurality of layers 1 of green ceramic dielectric which comprises mixtures of barium titanate with other oxides, titanates, zirconates, stannates, or precursors thereof. The layer 1 also contains temporary binders and other ingredients which aid in processing. There is a large body of patent literature describing these dielectrics and the procedures for preparing the same in sheet or layer form. On the layer 1 is applied an electrode pattern 2 which extends to one end 3 and is margined inward from the sides 4 and from the other end 5. The electrode pattern is applied as a paint in which the pigment is one of the transition metals such as nickel or a transition metal alloy. For application as a paint the metal pigment is dispersed or suspended in a vehicle which is vaporized or burned during the early stages of the ceramic firing. The section of the pattern 2 opposite bracket 6 is the capacity section of the electrode and the section opposite bracket 7 is a terminal extension by which electrical connection is made to the capacity section. Adjacent to end 5 of the sheet 1 is a shield pattern 8 which is conveniently applied at the same time and with the same paint as the pattern 2. The shield pattern 8 is electrically insulated from the electrode pattern 2 by a space 9. The layers 1 are stacked one on top of the other with alternate layers turned end for end as shown in FIG. 2. At both the upper and lower ends of the stack there is applied a sheet 1 of a dielectric having an electrode pattern which is not turned end for end relative to the immediately underlying electrode but has its terminal extension 7 to the same end of the stack as the immediately underlying electrode. The electrode pattern of the upper and lower ends is identical to that of FIG. 1, with the electrode pattern 2 and shield pattern 8 of the upper and lower ends directly overlapping the electrode pattern 2 and shield 8 of the next underlying electrode. The assembly of the green ceramic body is completed by several plain layers 10 of green ceramic. The stacked layers are then passed together and fired or sintered into a monolith as shown in FIG. 3.

In one example the ceramic was a standard commercial body known as K7000 having approximately 89% $BaTiO_3$, 10% $CaZrO_3$ and 1% other ingredients mixed with an organic binder and the paint was a metallic nickel pigment dispersed in an organic vehicle. The stack was baked at 530° F to burn off the organic materials present and the backed stack was then fired at about 1370° C for 2½ hours in an atmosphere having a partial pressure of oxygen between $1.8 \times 10^{-7}$ and $1.5 \times 10^{-6}$ atmospheres. The alternate electrodes extending to opposite ends of the capacitors are joined by a common conductor 11, 12 of a similar composition to the electrodes either before or after firing. FIG. 3 is representative of the fired monolithic ceramic capacitors with nickel electrodes fabricated by the described method with dielectric layers 1 and interleaved conductive nickel electrodes, having alternate electrodes connected at opposite ends 2 by a nickel conductor 11, 12.

During firing of the monolithic ceramic capacitors with nickel electrodes, an equilibrium is established between the atmospheric oxygen, the oxygen in the ceramic dielectric, and the nickel electrode, all of which share the available oxygen. There is insufficient oxygen in an atmosphere containing, for example, $6 \times 10^{-7}$ atmospheres of oxygen at 1370° C to cause oxidation of nickel, so that the nickel electrodes remain metallic and conductive in the bulk. However, at the interface between the nickel electrode and the oxygen bearing dielectric, oxidation of the nickel takes place by the sharing of oxygen with the dielectric. The oxidized nickel (i.e. $Ni^{+2}$) then reacts with the neighboring oxide. At the same time, the titanate based dielectric is reduced (releases oxygen to the firing atmosphere) because of the low oxygen content of the firing atmosphere.

The reduction of a barium titanate based dielectric normally leads to an undesirably high conductivity in the dielectric. This reaction can be represented by:

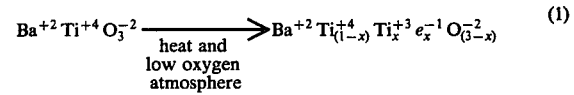

For charge balance, the reduction requires the production of unlocalized electrons which lead to an n-type (electron) conductivity in the dielectric.

However, while the oxygen is being removed from the dielectric, nickel, as $Ni^{+2}$, enters the dielectric and the total reaction is:

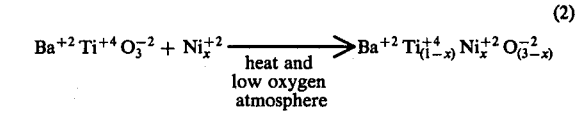

No excess of unlocalized electrons are required for charge balance, and n-type conductivity is not induced in the dielectric.

Figure 4:
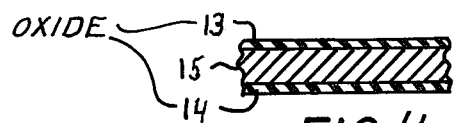
FIG. 4 is a diagrammatic enlarged section through a portion of one of the electrode layers after firing.

FIG. 4 is a schematic representation of the localized oxidation of the nickel electrode with concomitant $Ni^{+2}$ incorporation into the dielectric. The oxidation of the nickel electrode at its interface with the dielectric is readily observed microscopically and is shown schematically in FIG. 4 where 13 and 14 represent nickel oxide skins on the core 15 of metallic nickel. FIG. 4 represents qualitatively what happens in patterns 2 and 8. In the upper and lower electrode patterns the oxide skins are thicker because these patterns are outermost and have a greater bulk of ceramic from which oxygen can be obtained. These outer patterns shield the electrode patterns 2. Since these outer patterns are electrically inert, they can be sacrificed without affecting the capacitor. The shield patterns 8 prevent excessive oxidation of the terminal sections 7 of the patterns 2. While oxidation of the electrodes is essential to the reaction of equation 2, excessive oxidation is destructive and is prevented by the shield patterns 8, and the overlapping upper and lower patterns.

Figure 5:
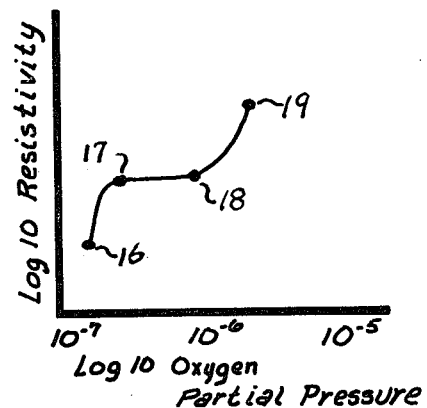
FIG. 5 is a diagram of resistivity against oxygen partial pressure.

It is necessary that there be enough oxygen to oxidize the skins of the electrodes but not so much oxygen as to completely oxidize the electrodes. This is illustrated in FIG. 5 which shows the results of firing K7000 ceramic at a temperature of 1370° C and at oxygen partial pressures of $1.8 \times 10^{-7}$, $2.7 \times 10^{-7}$, $8.9 \times 10^{-7}$ and $1.5 \times 10^{-6}$ atmospheres. At $1.8 \times 10^{-7}$ atmospheres (designated by the numeral 16) there is not enough oxygen in the atmosphere to produce the required oxidation of the skins of the electrodes at the nickel-dielectric interface. At this pressure a greater amount of oxygen was withdrawn from the dielectric resulting in unacceptable low resistivity of the dielectric. At an oxygen partial pressure of $1.5 \times 10^{-6}$ atmospheres (designated by the numeral 19) there was too much oxygen resulting in excessive oxidization in the nickel electrodes resulting in loss of conductivity of electrodes and loss of capacitance. At oxygen partial pressures $2.7 \times 10^{-7}$ atmospheres (designated by numeral 17) and $8.9 \times 10^{-7}$ atmospheres (designated by numberal 18), the oxidation of the skins of the electrodes was sufficient to protect the dielectric from excessive loss of oxygen and was not great enough to destroy the conductivity of the electrodes. The numeric values apply to the K7000 body and would be different for other bodies receiving different firing temperatures. However, the same kind of phenomenon is observed in all titanate ceramic bodies.

Figure 6:
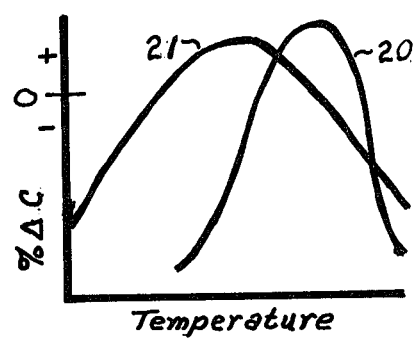
FIG. 6 is a diagram of the change in capacity with temperature.

FIG. 6 curve 20 shows the variation in percent of capacitance change with temperature for a K7000 monolithic ceramic capacitor with precious metal electrodes fired in air and curve 21 is a similar curve for a like capacitor with nickel electrodes fired at the same temperature in $5 \times 10^{-7}$ atmospheres oxygen partial pressure, a pressure midway between points 17 and 18 of the FIG. 5 curve. In addition to the change in electrical properties evident from curves 20 and 21 there is also a change in the microstructural physical properties. The grain size of the dielectric of curve 20 was 9 microns while the grain size of the dielectric of curve 21 was 2 microns. The incorporation of $Ni^{+2}$ into the dielectric modifies both the electrical and the microstructural physical properties of the dielectric.

Monolithic ceramic capacitors were fabricated according to the preceding description from an unaltered K7000 ceramic dielectric formulation. Three groups of capacitors were fabricated: one group with platinum electrodes, another with a mixture of nickel and platinum in the electrodes, and a final group with pure nickel electrodes. These capacitors were fired simultaneously at 1370° C for 2½ hours in a 25:1 mixture of $CO_2:CO$. This mixture yields an oxygen partial pressure of $7.9 \times 10^{-7}$ atmospheres at 1370° C. The room temperature products of resistance after one minute of charging at 77 VDC/mil and capacitance (RC product) were <0.05 sec, 586 sec, and 1272 sec, respectively.

These data show that the increase in nickel content in the electrode and coincidentally in the dielectric leads to an increase in the resistivity of the dielectric. These data are consistent with the previous technical explanation.

No appreciable shift in the Curie Temperature could be ascertained when the nickel electroded monolithic ceramic capacitors were fired over the partial pressure of oxygen range from $2.7 \times 10^{-7}$ atmospheres to $1.5 \times 10^{-6}$ atmospheres, while the capacitance remained within ± 10% of the mean over the range $1.8 \times 10^{-7}$ to $9 \times 10^{-7}$ atmospheres of oxygen. These data indicate the method employed in this patent is capable of the reproducibility required for a production method for fabricating monolithic ceramic capacitors with embedded base metal electrodes.

Capacitors fabricated according to the method herein described were life tested at 85° C by imposing 77 VDC/mil stress for extended periods of time. The results are summarized as follows:

(A) Initial capacitance and dissipation factor at 1 KHz and 1 volt, and insulation resistance at 77 VDC/mil after one minute charging and RC product all measured at 25° C were 387 nF, 0.99%, 2.52 GΩ, and 975 ΩF (sec).
(B) After 100 hours — 394 nF, 1.10%, 2.22 GΩ, and 874 sec, respectively at 25° C.
(C) After 200 hours — 362 nF, 1.00%, 3.33 GΩ, and 1205 sec, respectively at 25° C.
(D) After 500 hours — 373 nF, 1.0%, 1.98 GΩ, and 739 sec, respectively at 25° C.

These data show that the base metal electroded monolithic ceramic capacitors encompassed by this patent produces capacitors having useful properties over the life time expected for these capacitors in normal operation.

The foregoing examples are based on K7000 dielectric with nickel electrodes.

The invention has produced some potentially useful properties employing other dielectric compositions and non-precious metal electrodes.

A dielectric composition known as K2000 having the composition 92% $BaTiO_3$, 3.5% $CaZrO_3$, 1.5% $SrTiO_3$, and 3% other ingredients normally fired with precious metal electrodes was prepared as monolithic capacitors with nickel electrodes and with precious metal electrodes. The two types of capacitors were fired simultaneously at 2560° F for 2¼ hours with an atmosphere of 25 parts $CO_2$ to 1 part CO ($2 \times 10^{-6}$ atmospheres of oxygen). The six nickel electroded units had average values as follows: capacitance = 122 nF, dissipation factor = 1.5%, insulation resistance = 0.94 GΩ, RC product = 115 sec. The precious metal electroded units had resistances of 2000 Ω to 8000 Ω at 1.5 VDC, far too conductive to measure any capacitance. Clearly, the fabrication method herein described yielded superior results.

The dielectric composition known as NPO having a composition of 59% $Nd(CO_3)_4$, 26% $TiO_2$, and 15% $BaTiO_3$, which is normally employed with precious metal electrodes was prepared both with a mixture of platinum and nickel and with a precious metal electrode. Firing was at 2350° F for 2½ hours in a 25 parts $CO_2$ to 1 part CO mixture yielding an oxygen pressure of $1.05 \times 10^{-7}$ atmospheres. Resistances measured at 1.5 VDC with an ohm-meter were 270,000 Ω for the platinum-nickel electrodes, and 10 Ω for the precious metal electrodes. The beneficial effect of the nickel is observable in this case.

A dielectric composition known as K1200 having the composition 80% $BaTiO_3$, 11% $Bi_2Ti_2O_7$, and 9% $CaSnO_3$ was prepared in two groups with nickel electrodes and platinum electrodes, respectively. Firing was as for NPO above. The nickel electroded units had capacitance = 33 nF, dissipation factor = 4.8%, insulation resistance 1.58 G$\Omega$ and RC product = 52 sec. The platinum electroded capacitors had no continuous internal electrodes apparently because the atmosphere, along with the bismuth from the dielectric composition, lowered the melting point of platinum so that melting took place.

A composition composed of barium titanate, $BaTiO_3$, with a small addition of lanthanum oxide, $La_2O_3$ was prepared as thin discs. This composition, when fired at low oxygen partial pressures, has been used to give highly conductive $BaTiO_3$. Some of the discs were painted with nickel external electrodes before firing, while others were fired without electrodes. Firing was at 2500° F for 2½ hours at 25:1 ratio of $CO_2$ to CO. The nickel electroded discs yielded a capacitance of 13 nF, a dissipation factor of 18%, and an insulation resistance of 0.4 G$\Omega$ at 100 VDC. The calculated dielectric constant was 10,000. The unelectroded discs were painted with silver paint and yielded a resistance of 408 $\Omega$ measured at 1.5 VDC. The nickel electrodes greatly improved the resistance of the dielectric.

An electrode system containing 90% nickel and 10% tin was employed in monolithic capacitors with the K7000 dielectric, and fired at 1370° C for 2½ hours at an oxygen pressure of $7.9 \times 10^{-7}$ atmosphere. The properties were: capacitance = 43 nF, RC product = 516 sec. In terms of the technical discussion, entry of $Sn^{+4}$ (oxidized tin) into the dielectric could not cause charge balance within the dielectric without excess electrons being present. Hence the insulation resistance is lowered. Also, since the nickel in this case is diluted by tin, the nickel did not enter the dielectric to the extent to which it could if undiluted, and, therefore, could not improve the insulation resistance to the extent which was accomplished with pure nickel electrodes.

The oxidation resistance of several electrode metals or combination of metals have been studied. The electrodes studied are as follows: nickel, nickel-copper, nickel-zinc, nickel-sodium oxide, nickel-cobalt, cobalt-iron, nickel-iron, nickel-tantalum, chromium, nickel-chromium, cobalt, iron, nickel-tin, nickel-chromium oxide.

The rationale of selecting an electrode metal system can be most conveniently illustrated by considering a specific case. For the previously mentioned dielectric, NPO, the required firing temperature is near 2300° F (1250° C). Pure nickel will remain unoxidized in the bulk at oxygen partial pressure of less than $2 \times 10^{-7}$ atmospheres at this temperature. However, this oxygen partial pressure will cause conductivity to be high in fired NPO unless the nickel as $Ni^{+2}$ enters the dielectric in sufficient quantity as previously described. Also, nickel metal will not melt at this temperature. In order to produce less conductivity in the NPO, it would be desirable to fire at higher oxygen partial pressures. One possible alternative would be to select an electrode composed of copper which will remain unoxidized up to partial pressures of oxygen of $2.3 \times 10^{-5}$ atmospheres at 2300° F (two orders of magnitude higher). However, copper melts at 1980° F and would be unsuitable on this account. A solid solution of copper and nickel in the ratio of 40% by weight nickel and 60% by weight copper melts at about 2325° F, and once the solid solution is formed, this solid solution should yield oxidation resistance superior to nickel but inferior to pure copper. This effect has already been proven by simultaneous firing of pure nickel on the top surface of a piece of dielectric and the above mixture of metals on a piece of dielectric. In this case, the nickel oxidized completely, whereas the solution had a resistance of about 0.1 $\Omega$ at 1.5 VDC. Also, the color of the dielectric with the nickel-copper electrodes was a brown or orange as compared with the normal dark grey color caused by reduced oxygen firing. The resistance at 100 volts was 2 G$\Omega$ as compared with a very high conductivity (but not measured) for NPO fired simultaneously but with precious metal electrodes. The difference in color and resistance indicates that a beneficial modification of the dielectric has occurred due to the presence of the copper-nickel electrodes. The unique features of this method of fabrication are as follows:

(A) The electrode material must make a contribution by reaction to the properties of the dielectric. This is easily observed by firing base metal electroded capacitors and precious metal electroded capacitors simultaneously in the same low oxygen partial pressure atmosphere. In the previous examples and the Disclosure itself, this is observed as increased resistance of the ceramic with base metal electrodes, modification of grain size of the ceramic, and shift in the Curie temperature (temperature of maximum capacitance).

(B) The dielectric composition is not prepared especially for reduced oxygen partial pressure firing. Improvements to the dielectric composition come about because of (A) above.

(C) The quantity of oxygen in the firing atmosphere is determined by the base metal-ceramic combination so that the base metal is not oxidized in the bulk but is oxidized at the dielectric-base metal interface, and the dielectric is not reduced any more than required for the base metal reaction to take place.

I claim:

1. A method for making a monolithic capacitor having a sintered unitary body of titanate ceramic and electrodes embedded in the body which comprises preparing a green ceramic body with embedded electrodes of metal M, where M is selected from the group consisting of transition metals and/or transition metal alloys, and firing the green ceramic body at a temperature to mature the ceramic and in an atmosphere of oxygen partial pressure low enough so that the skins of the electrodes oxidize and react with the ceramic and prevents conversion of the ceramic to the semiconductive state and the cores of the electrodes remain in the metallic state.

2. The method of claim 1 in which the ceramic comprises barium titanate.

3. The method of making a monolithic capacitor having a sintered unitary body of titanate ceramic and electrodes embedded in the body which comprises preparing a green ceramic body with embedded electrodes of metal M, where M is selected from the group consisting of transition metal and/or transition metal alloys and the electrodes have terminal extensions extending to different outer surfaces of the body and a shield element of metal M is interleaved between adjacent terminal extensions and is spaced from the electrodes and terminal extensions, and firing the green ceramic body at a temperature to mature the ceramic and in an atmosphere of oxygen partial pressure low enough so that the skins of the electrodes oxidize and react with the ceramic and the cores of the electrodes remain in the metallic state.

4. The method of claim 1 in which a shield layer of metal M is provided in an outer part of the green ceramic body which shield layer overlaps and is spaced from the immediately underlying electrode.

5. The method of claim 1 in which the reaction between the electrodes and the ceramic is in accordance with the equation

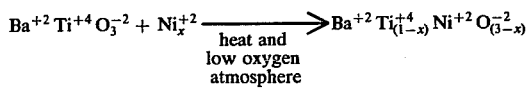

6. The method of claim 1, in which the oxygen partial pressure is greater than $10^{-7}$ atmosphere.

7. The method of claim 1 in which the metal M is nickel.

8. The method of claim 1 in which the metal M is selected from the group consisting of nickel, nickel-copper, nickel-zinc, nickel-sodium oxide, nickel-cobalt, cobalt-iron, nickel-iron, nickel-tantalum, chromium, nickel-chromium, cobalt, iron, nickel-tin, nickel-chromium oxide.

9. The method of claim 1 in which terminations comprising metal M are applied to outer surfaces of the green ceramic body and make connections to said terminal extensions.

10. A monolithic capacitor having a sintered unitary body of sintered green titanate ceramic and electrodes embedded in the sintered green ceramic, the electrodes being of metal M, where M is selected from the group consisting of transition metals and/or transition metal alloys, the body having been sintered in an atmosphere of oxygen partial pressure low enough so that the skins of the electrodes oxidize and react with the ceramic and prevents conversion of the ceramic to the semiconductive state and the cores of the electrodes remain in the metallic state.

11. The capacitor of claim 10 in which the ceramic comprises barium titanate.

12. The capacitor of claim 10 in which the electrodes have terminal extensions with alternate extensions extending to different outer surfaces of the body and a shield element of metal M is interleaved between alternate extensions and is spaced from the electrodes and extensions.

13. The capacitor of claim 10 in which a shield layer of Metal M in the outer part of said ceramic body overlaps and is spaced from the immediately underlying electrode.

14. The capacitor of claim 10 in which the reaction between the electrodes and the ceramic is in accordance with the equation

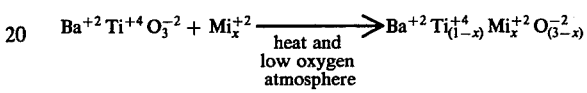

15. The capacitor of claim 10 in which the oxygen partial pressure is greater than $10^{-7}$ atmospheres.

16. The method of claim 9 in which the metal M comprises nickel.

17. The capacitor of claim 10 in which the metal M is selected from the group consisting of nickel, nickel-copper, nickel-zinc, nickel-sodium oxide, nickel-cobalt, cobalt-iron, nickel-iron, nickel-tantalum, chromium, nickel-chromium, cobalt, iron, nickel-tin, nickel-chromium oxide.

18. The capacitor of claim 10, in which terminations comprising metal M applied to outer surfaces of the green ceramic make connections to said terminal extensions.

19. The capacitor of claim 18 in which the metal M comprises nickel.

20. The capacitor of claim 10 in which the metal M comprises nickel.

* * * * *